US008208536B2

(12) United States Patent
Pun et al.

(10) Patent No.: US 8,208,536 B2
(45) Date of Patent: Jun. 26, 2012

(54) METHOD AND APPARATUS FOR ENCODING USING SINGLE PASS RATE CONTROLLER

(75) Inventors: Thomas Pun, San Jose, CA (US); Hsi Jung Wu, Sunnyvale, CA (US); Adriana Dumitras, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1410 days.

(21) Appl. No.: 11/118,618

(22) Filed: Apr. 28, 2005

(65) Prior Publication Data
US 2006/0245492 A1 Nov. 2, 2006

(51) Int. Cl.
H04N 7/12 (2006.01)

(52) U.S. Cl. ................................. 375/240.03
(58) Field of Classification Search ............. 375/240.03
See application file for complete search history.

(56) References Cited

U.S. PATENT DOCUMENTS

| 5,333,012 A | | 7/1994 | Singhal et al. |
| 5,337,049 A | * | 8/1994 | Shimoda ......................... 341/50 |
| 5,416,604 A | * | 5/1995 | Park ............................... 382/232 |
| 5,691,770 A | | 11/1997 | Keesman et al. |
| 5,778,192 A | | 7/1998 | Schuster et al. |
| 5,801,779 A | | 9/1998 | Uz et al. |
| 5,867,221 A | | 2/1999 | Pullen et al. |
| 5,872,598 A | | 2/1999 | Legall et al. |
| 5,929,916 A | | 7/1999 | Legall et al. |
| 6,023,296 A | | 2/2000 | Lee et al. |
| 6,101,276 A | | 8/2000 | Adiletta et al. |
| 6,111,991 A | | 8/2000 | Ribas-corbera et al. |
| 6,148,107 A | | 11/2000 | Ducloux et al. |
| 6,192,075 B1 | | 2/2001 | Jeng et al. |
| 6,229,925 B1 | | 5/2001 | Alexandre et al. |
| 6,278,735 B1 | * | 8/2001 | Mohsenian ................... 375/240 |
| 6,295,375 B1 | | 9/2001 | Andry |
| 6,411,738 B2 | | 6/2002 | Fert et al. |

(Continued)

FOREIGN PATENT DOCUMENTS
CN 1176562 3/1998
(Continued)

OTHER PUBLICATIONS

Jungwoo Lee and Bradley W. Dickinson, "Temporally adaptive motion interpolation exploiting temporal masking in visual perception," IEEE Trans. on Image Processing, vol. 3, No. 5, pp. 513-526, Sep. 1994.

(Continued)

Primary Examiner — Jay Patel
Assistant Examiner — Richard Torrente
(74) Attorney, Agent, or Firm — Adeli & Tollen LLP

(57) ABSTRACT

A method is used for specifying a bit allocation for encoding a set of images in a sequence of video images. The method computes a masking value for one or more images. The method computes a bit allocation for a current image based on the computed masking value of one or more images. The method further ascertains a total number of bits used for images that have been already encoded before computing the bit allocation. The computed bit allocation for the current image is also based on the total number of bits used. The method specifies a bit allocation for the current image by specifying a quantization parameter (QP) value for the current image. The method then adjusts the specified QP value based on a categorization of the current image.

34 Claims, 9 Drawing Sheets

U.S. PATENT DOCUMENTS

| | | |
|---|---|---|
| 6,414,992 B1 | 7/2002 | Sriram et al. |
| 6,490,320 B1 | 12/2002 | Vetro et al. |
| 6,493,385 B1 | 12/2002 | Sekiguchi et al. |
| 6,493,386 B1 | 12/2002 | Vetro et al. |
| 6,574,279 B1 | 6/2003 | Vetro et al. |
| 6,650,707 B2 | 11/2003 | Youn et al. |
| 6,760,482 B1 | 7/2004 | Taubman |
| 6,826,228 B1 | 11/2004 | Hui |
| 6,925,119 B2 | 8/2005 | Bartolucci et al. |
| 6,975,680 B2 | 12/2005 | Demos |
| 7,016,407 B2 | 3/2006 | Kaye et al. |
| 7,042,943 B2 | 5/2006 | Haskell et al. |
| 7,079,581 B2 | 7/2006 | Noh et al. |
| 7,095,784 B2 | 8/2006 | Chang et al. |
| 7,194,035 B2 | 3/2007 | Dumitras et al. |
| 7,697,608 B2 | 4/2010 | Lee |
| 7,822,118 B2 | 10/2010 | Haskell et al. |
| 8,005,139 B2 | 8/2011 | Wu et al. |
| 2001/0000704 A1 | 5/2001 | Fert et al. |
| 2001/0014121 A1 | 8/2001 | Kaye et al. |
| 2003/0202580 A1 | 10/2003 | Noh et al. |
| 2004/0096113 A1 | 5/2004 | Taima |
| 2004/0114817 A1* | 6/2004 | Jayant et al. ............ 382/239 |
| 2005/0169370 A1* | 8/2005 | Lee ............ 375/240.03 |
| 2005/0286631 A1 | 12/2005 | Wu et al. |
| 2006/0013298 A1 | 1/2006 | Tong et al. |
| 2006/0193382 A1 | 8/2006 | Haskell et al. |
| 2010/0329333 A1 | 12/2010 | Haskell et al. |

FOREIGN PATENT DOCUMENTS

| | | |
|---|---|---|
| EP | 0910212 A2 | 4/1999 |
| EP | 1170954 | 1/2002 |
| EP | 1 563 688 | 8/2005 |
| EP | 1762093 | 3/2007 |
| EP | 1 933 569 | 6/2008 |
| EP | 2271104 | 1/2011 |
| JP | 8-275176 | 10/1996 |
| JP | 2001-501429 | 1/2001 |
| JP | 2001-520854 | 10/2001 |
| JP | 2004-166128 | 6/2004 |
| KR | 10-0305941 | 10/1999 |
| KR | 1999-77445 | 10/1999 |
| KR | 2003-82818 | 10/2003 |
| TW | 545066 | 8/2003 |
| WO | WO 96/34495 | 10/1996 |
| WO | WO 99/07158 | 2/1999 |
| WO | WO 99/43163 | 8/1999 |
| WO | WO 02/089489 | 11/2002 |
| WO | WO 2004/045218 | 5/2004 |
| WO | WO 2005/011255 | 2/2005 |
| WO | WO 2006/004605 | 1/2006 |

OTHER PUBLICATIONS

Austin Y. Lan, A.G. Nguyen, and J-N Hwang, "Scene-context-dependent reference-frame placement for MPEG video coding," IEEE Trans. on Circuits and Systems for Video Technology, vol. 9, No. 3, pp. 478-489, Apr. 1999.

Xiaodong Gu and Hongjiang Zhang, "Implementing dynamic GOP in video encoding," in IEEE Intl. Conference on Multimedia and Expo (ICME), Baltimore, 2003, vol. 1, pp. 349-352.

Adriana Dumitra and Barry G. Haskell, "I/P/B frame type decision by collinearity of displacements," in Proceedings of IEEE Intl. Conference on Image Processing, 2004. pp. 2769-2772.

J. Lee and B.W. Dickinson, "Scene-adaptive motion interpolation structures based on temporal masking in human visual perception," in Proc. SPIE Conference on Visual Comm. and Image Processing, Cambridge, 1993, pp. 499-510.

Yi-Jen Chiu and Toby Berger, "A software-only videocodec using pixelwise conditional differential replenishment and perceptual enhancements," IEEE Trans. on Circuits and Systems for Video Technology, vol. 9, No. 3, pp. 438-450, Apr. 1999.

Mark R. Pickering and John F. Arnold, "A perceptually efficient VBR rate control algorithm," IEEE Trans. on Image Processing, vol. 3, No. 5, pp. 527-532, Sep. 1994.

N. Jayant, J. Johnston, and R. Safranek, "Signal compression based on models of human perception," Proceedings for IEEE, vol. 81, pp. 1385-1422, Oct. 1993.

Chun-Hsien Chou and Y.-C Li, "A perceptually tuned subband image coder based on the measure of Just-Noticeable-Distortion profile," IEEE Trans. on Circuits and Systems for Video Technology, vol. 5, No. 6, pp. 467-476, Dec. 1995.

K.T. Tan and Mohammed Ghanbari, "A multi-metric objective picture-quality measurement model for MPEG model," IEEE Trans. on Circuits and Systems for Video Technology, vol. 10, No. 7, pp. 1208-1213, Oct. 2000.

Atul Pun and R. Aravind, "Motion-compensated video coding with adaptive perceptual quantization," IEEE Trans. on Circuits and Systems for Video Technology, vol. 1, No. 4, pp. 351-361, Dec. 1991.

Soon Hie Tan, Knee K. Pang, and K.N. Ngan, "Classified perceptual coding with adaptive quantization," IEEE Trans. on Circuits and Systems for Video Technology, vol. 6, No. 4, pp. 375-388, Aug. 1996.

Wei Ding and B. Liu, "Rate control of MPEG video coding and recoding by Rate-Quantization modeling," IEEE Trans. on Circuits and Systems for Video Technology, vol. 6, No. 1, pp. 12-20, Feb. 1996.

Ashish Jagmohan and K. Ratakonda, "MPEG-4 one-pass VBR rate control for digital storage," IEEE Trans. on Circuits and Systems for Video Technology, vol. 13, No. 5, pp. 447-452, May 2003.

Anthony Vetro, H. Sun, and Y. Wang, "MPEG-4 rate control for multiple object coding," IEEE Trans. on Circuits and Systems for Video Technology, vol. 9, No. 1, pp. 186-199, Feb. 1999.

Non-Final Office Action of U.S. Appl. No. 10/615,117, Jun. 17, 2005 (mailing date), Haskell, Barin G., et al.

International Preliminary Report on Patentability for PCT/US2005/022616, Jan. 11, 2007 (mailing date), Apple Computer, Inc.

International Search Report for PCT/US2005/022616, Mar. 20, 2006 (mailing date), Apple Computer, Inc.

Written Opinion for PCT/US2005/022616, Mar. 20, 2006 (mailing date), Apple Computer, Inc.

Notice of Allowance of U.S. Appl. No. 10/615,117, Oct. 27, 2005 (mailing date), Haskell, Barin G., et al.

Antonio Ortega, R. Ramchandran, and M. Vetterli, "Optimal trellis-based buffered compression and fast approximation," IEEE Trans. on Image Processing, vol. 3, pp. 26-40, Jan. 1994.

Hirohisa Jozawa, K. Kamikura, A. Sagata, H. Kotera, and H. Watanabe, "Two-stage motion compensation using adaptive global MC and local affine MC," IEEE Trans. on Circuits and Systems for Video Tech., vol. 7, No. 1, pp. 75-82, Feb. 1997.

Wei Ding, "Joint encoder and channel rate control of VBR video over ATM networks," IEEE Trans. on Circuits and Systems for Video Technology, vol. 7, No. 2, pp. 266-278, Apr. 1997.

Kuo-Chin Fan and K.-S. Kan, "An active scene analysis-based approach for pseudoconstant bit-rate video coding," IEEE Trans. on Circuits and Systems for Video Technology, vol. 8, No. 2, pp. 159-170, Apr. 1998.

Antonio Ortega and R. Ramchandran, "Rate-Distortion methods for image and video compression," IEEE Signal Processing Magazine, vol. 15, No. 6, pp. 23-50, Nov. 1998.

Jordin Ribas-Corbera and S. Lei, "Rate control in DCT video coding for low-delay communications," IEEE Trans. on Circuits and Systems for Video Technology, vol. 9, No. 1, pp. 172-185, Feb. 1999.

L. Wang and A. Vincent, "Bit allocation and constraints for joint coding of multiple video programs," IEEE Trans. on Circuits and Systems for Video Technology, vol. 9, No. 6, pp. 949-959 Sep. 1999.

Jose I. Ronda, F. Jaureguizar, and N. Garcia, "Rate control and bit allocation for MPEG-4," IEEE Trans. on Circuits and Systems for Video Technology, vol. 9, No. 8, pp. 1243-1258, Dec. 1999.

Frederic Dufaux and J. Konrad, "Efficient, robust and fast global motion estimation for video coding," IEEE Trans. on Image Processing, vol. 9, No. 3, pp. 497-501, Mar. 2000.

Hung-Ju Lee, T. Chiang, and Y.-Q. Zhang, "Scalable rate control for MPEG-4 video," IEEE Trans. on Circuits and Systems for Video Technology, vol. 10, No. 6, pp. 878-894, Sep. 2000.

Lila Boroczky, A.Y. Ngai, and E.F. Westermann, "Joint rate-control with look-ahead for multi-program video coding," IEEE Trans. on Circuits and Systems for Video Technology, vol. 10, No. 7, pp. 1159-1163, Oct. 2000.

I-Ming Pao and Ming-Ting Sun, "Encoding stored video for streaming applications," IEEE Trans. on Circuits and Systems for Video Technology, vol. 11, No. 2, pp. 199-209, Feb. 2001.

H. Song and C-C. Jay Kuo, "Rate control for low-bit-rate video via variable-encoding frame rates," IEEE Trans. on Circuits and Systems for Video Technology, vol. 11, No. 4, pp. 512-521 Apr. 2001.

Y. Yu, J. Zhou, Y. Wang, and C.W. Chen, "A novel two-pass VBR algorithm for fixed-size storage application," IEEE Trans. on Circuits and Systems for Video Technology, vol. 11, No. 3, pp. 345-356 Mar. 2001.

Supavadee Aramvith, I.-M. Pao, and M.-T. Sun, "A rate-control for video transport over wireless channels," IEEE Trans. on Circuits and Systems for Video Technology, vol. 11, No. 5, pp. 569-580, May 2001.

Yan Yang and S.S. Hemami, "Rate control for VBR video over ATM: Simplification and implementation," IEEE Trans. on Circuits and Systems for Video Technology, vol. 11, No. 9, pp. 1045-1058, Sep. 2001.

Zhihai He and S.K. Mitra, "Optimum bit allocation and accurate rate control for video coding via p-domain source modeling," IEEE Trans. on Circuits and Systems for Video Technology, vol. 12, No. 10, pp. 840-849, Oct. 2002.

Christophe De Vleeschouwer, T. Nilsson, K. Denolf, and J. Bormans, "Algorithmic and architectural co-design of a motion-estimation engine for low-power video devices," IEEE Trans. on Circuits and Systems for Video Technology, vol. 12, No. 12, pp. 1093-1105, Dec. 2002.

Feng Pan, Z. Li, K. Lim, and G. Feng, "A study of MPEG-4 rate control scheme and its improvements," IEEE Trans. on Circuits and Systems for Video Technology, vol. 13, No. 5, pp. 440-446, May 2003.

Jeong-Woo Lee, A. Vetro, Y. Wang, and Y.-S. Ho, "Bit allocation for MPEG-4 video coding with spatio-temporal tradeoffs," IEEE Trans. on Circuits and Systems for Video Technology, vol. 13, No. 6, pp. 488-502, Jun. 2003.

Pol-Lin Tai, Shih-Yu Huang, C.T. Liu, and J.S. Wang, "Computation-aware scheme for software-based block motion estimation," IEEE Trans. on Circuits and Systems for Video Technology, vol. 13, No. 9, pp. 901-913, Sep. 2003.

Mei-Yin, Shen, et. al., "Fast Compression Artifact Reduction Technique Based on Nonlinear Filtering," *Proceedings of the 1999 IEEE International Symposium on Circuits and Systems*. May 30, 1999, pp. 179-182, IEEE, US.

Segall C. A., et. al., "Pre- and Post-Processing Algorithms for Compressed Video Enhancement," *Conference Record of the 34th Asilomar Conference on Signals, Systems, & Computers*, Oct. 29, 2000, pp. 1369-1373, vol. 2 of 2, conf. 34, IEEE, US.

Seungjoon, Yang, et. al., "Blocking Effect Removal Using Regularization and Dithering," *1998 International Conference on Image Processing*, Oct. 4, 1998, pp. 415-419, IEEE Comput. Soc., US.

Mei-Yin, Shen, et. al., "Real-time Compression Artifact Reduction Via Robust Nonlinear Filtering," *1999 International Conference on Image Processing*, Oct. 24, 1999, pp. 565-569, IEEE, US.

Dumitras, A., et. al., "Enhancement of Direct Mode Selection in B Pictures for Bit Rate Reduction of Compressed Video Sequences," *2003 International Conference on Image Processing*, Sep. 14, 2003, pp. 825-828, vol. 3, IEEE, US.

Zhu Q.-F., et. al., "Image Reconstruction for Hybrid Video Coding Systems," *Data Compression Conference*, Mar. 24, 1992, pp. 229-238, IEEE Comput. Soc., US.

U.S. Appl. No. 12/795,650, filed Jun. 7, 2010, Haskell, Barin Geoffry, et al.

Updated portions of prosecution history of U.S. Appl. No. 10/615,117, Sep. 19, 2005, Haskell, Barin Geoffry, et al.

Portions of prosecution history of U.S. Appl. No. 11/344,591, May 17, 2010, Haskell, Barin Geoffry, et al.

Portions of prosecution history of U.S. Appl. No. 12/795,650, Sep. 13, 2010, Haskell, Barin Geoffry, et al.

Portions of prosecution history of U.S. Appl. No. 11/118,604, Aug. 4, 2010, Wu, Hsi Jung, et al.

International Search Report of PCT/US2003/034659, Mar. 12, 2004 (mailing date), Apple Computer, Inc.

Written Opinion of PCT/US2003/034659, Sep. 13, 2005 (mailing date), Apple Computer, Inc.

International Preliminary Examination Report of PCT/US2003/034659, Jun. 21, 2006 (mailing date), Apple Computer, Inc.

EP Office Action of EP 03 77 8014.5, Apr. 11, 2006 (mailing date), Apple Computer, Inc.

EP Office Action of EP 03 77 8014.5, Mar. 9, 2009 (mailing date), Apple Computer, Inc.

EP Search Report of EP 08 00 5751.6, May 25, 2010 (mailing date), Apple Computer, Inc.

Updated portions of prosecution history of U.S. Appl. No. 11/344,591, Jun. 24, 2010, Haskell, Barin Geoffry, et al.

Portions of prosecution history of U.S. Appl. No. 11/118,616, Feb. 7, 2011, Tong, Xin, et al.

Updated portions of prosecution history of U.S. Appl. No. 11/118,604, Jan. 21, 2011, Wu, Hsi Jung, et al.

Updated portions of prosecution history of EP03778014, Dec. 2, 2010 (mailing date), Apple Inc.

Updated portions of prosecution history of EP08005751, Sep. 30, 2010 (mailing date), Apple Inc.

Amendment Under Article 19 for PCT/US2005/022616, May 12, 2006, Apple Inc.

U.S. Appl. No. 13/179,476, filed Jul. 8, 2011, Wu, Hsi Jung, et al.

Updated portions of prosecution history of U.S. Appl. No. 12/795,650, Nov. 17, 2011, Haskell, Barin Geoffry, et al.

Updated portions of prosecution history of U.S. Appl. No. 11/118,616, Oct. 14, 2011, Tong, Xin, et al.

Updated portions of prosecution history of U.S. Appl. No. 11/118,604, Jul. 14, 2011, Wu, Hsi Jung, et al.

Portions of prosecution history of U.S. Appl. No. 13/179,476, Oct. 12, 2011, Wu, Hsi Jung, et al.

Updated portions of prosecution history of EP08005751, Sep. 23, 2011 (mailing date), Apple Inc.

Portions of prosecution history of EP05773224, May 31, 2011 (mailing date), Apple Inc.

Author Unknown, ISO/IEC 14496-10, "Information technology—coding of audio-visual objects—Part 10: Advanced video coding" Oct. 1, 2004.

Author Unknown, ISO/IEC 14496-10, "Information technology—coding of audio-visual objects—Part 10: Advanced video coding"; also ITU-T Recommendation H.264: "Advanced video coding for generic audiovisual services", 2003.

Chen, Michael C., et al., "Rate-Distortion Optimal Motion Estimation Algorithms for Motion-Compensated Transform Video Coding," IEEE Transactions on Circuits and Systems for Video Technology, Apr. 1998, pp. 147-158, vol. 8, No. 2.

Chen, Zhibo, et al., "Fast Motion Estimation for JVT," ISO/IEC JTC 1/SC29/WG11 and ITU-T SG16 Q.6, 7, Mar. 7-14, 2003, Pattaya II, Thailand. (JVT-G016).

Cheng, Po-Yuen, et al., "Rate Control for an Embedded Wavelet Video Coder," IEEE Transactions on Circuits and Systems for Video Technology, Aug. 1997, pp. 696-702, vol. 7, No. 4.

Gallant, Michael, et al., "An Efficient Computation-Constrained Block-Based Motion Estimation Algorithm for Low Bit Rate Video Coding," IEEE Transactions on Circuits and Systems for Video Technology, Dec. 1999, pp. 1816-1823, vol. 8, No. 12.

Girod, Bernd, "Rate-constrained motion estimation," in Proc. SPIE Conference on Visual Communications and Image Processing,1994, pp. 1026-1034, vol. 2308, Chicago, IL, USA.

Hoang, Dzung T., et al., "Efficient Cost Measures for Motion Estimation at Low Bit Rates," IEEE Transactions on Circuits and Systems for Video Technology, Aug. 1998, pp. 488-500, vol. 8, No. 4.

Horowitz, Michael, et al., "H.264/AVC Baseline Profile Decoder Complexity Analysis," IEEE Transactions on Circuits and Systems for Video Technology, Jul. 2003, pp. 704-716, vol. 13, No. 7.

Lee, Jungwoo, et al., "Rate-Distortion Optimized Frame Type Selection for MPEG Encoding," IEEE Transactions on Circuits and Systems for Video Technology, Jun. 1997, pp. 501-510, vol. 7, No. 3.

Lee, Sanghoon, et al., "Foveated Video Compression with Optimal Rate Control," IEEE Transactions on Image Processing, Jul. 2001, pp. 977-992, vol. 10, No. 7.

Lin, Liang-Jin, et al., "Bit-Rate Control Using Piecewise Approximated Rate-Distortion Characteristics," IEEE Transactions on Circuits and Systems for Video Technology, Aug. 1998, pp. 446-459, vol. 8, No. 4.

Ribas-Corbera, Jordi, et al., "A Frame-Layer Bit Allocation for H.263+," IEEE Transactions on Circuits and Systems for Video Technology, Oct. 2000, pp. 1154-1158, vol. 10, No. 7.

Wang, Limin, "Bit Rate Control for Hybrid DPCM/DCT Video Codec," IEEE Transactions on Circuits and Systems for Video Technology, Oct. 1994, pp. 509-517, vol. 4, No. 5.

Wiegand, Thomas, "Study of Final Committee Draft of Joint Video Specification (ITU-T Rec. H.264/ISO/IEC 14493-10 AVC)," Dec. 5-13, 2002, Awaji Island, Japan. (JVT-F100).

* cited by examiner

METHOD AND APPARATUS FOR ENCODING USING SINGLE PASS RATE CONTROLLER

FIELD OF THE INVENTION

The present invention is directed towards a single pass rate controller for encoding video.

BACKGROUND OF THE INVENTION

Video encoders encode a sequence of video images (e.g., video frames) by using a variety of encoding schemes. Video encoding schemes typically interblock or intrablock encode video frames or macroblocks within the video frames (where a macroblock is a 16×16 set of pixels in a video frame). An intrablock encoded frame or macroblock is one that is encoded independently of other frames or macroblocks in other frames. An interblock encoded frame or macroblock is one that is encoded by reference to one or more other frames or macroblocks in other frames.

When compressing video frames, some encoders implement a 'rate controller,' which provides a 'bit budget' for a video frame or a set of video frames that are to be encoded. The bit budget specifies the number of bits that have been allocated to encode the video frame or set of video frames. By efficiently allocating the bit budgets, the rate controller attempts to generate the highest quality compressed video stream in view of certain constraints (e.g., a target bit rate, etc.).

To date, a variety of single-pass and multi-pass rate controllers have been proposed. A single-pass rate controller provides bit budgets for an encoding scheme that encodes a series of video images in one pass, whereas a multi-pass rate controller provides bit budgets for an encoding scheme that encodes a series of video images in multiple passes.

Multi-pass rate controllers optimize the encoding for a particular bit rate based on a set of constraints. Single-pass rate controllers, on the other hand, are suitable for many applications (e.g., real-time encoding applications) that are not typically well suited for multi-pass encoding.

Prior single-pass rate controllers do not typically consider the spatial or temporal complexity of frames or pixel-sets within the frames in controlling the bit rates of their encodings. Also, prior single-pass rate controllers often do not estimate allocation of bits to future frames while allocating bits to a current frame. In addition, these rate controllers typically do not roll over unused bits allocations from prior frames to future frames. Prior single-pass rate controllers also assign bits to blocks of frames, without adaptively modifying the sizes of the blocks to the bit allocation. Therefore, there is a need in the art for an adaptive, single-pass rate controller that can achieve superior encoding results by flexibly accounting for a variety of conditions during the encoding.

SUMMARY OF THE INVENTION

Some embodiments of the invention provide a method for specifying a bit allocation for encoding a set of images in a sequence of video images. The method computes a masking value for one or more images. The method computes a bit allocation for a current image based on the computed masking value of one or more images.

In some embodiments, the method further ascertains a total number of bits used for images that have been already encoded before computing the bit allocation. The computed bit allocation for the current image is also based on the total number of bits used in some embodiments of the invention.

In some embodiments, the method specifies a bit allocation for the current image by specifying a quantization parameter (QP) value for the current image. The method then adjusts the specified QP value based on a categorization of the current image. Examples of such categorizations include: (1) category 1 images, which are images at natural scene changes or images that collectively capture a fast motion, (2) category 2 images, which are images forced to be intrablock encoded and are not category 1 images, (3) category 3 images, which are images that should be easy to encode, (4) category 4 images, which are images at the transition between simple and difficult images, and (5) category 5 images, which are images that do not fall in the other categories.

In some embodiments, the sequence of frames is divided into a set of blocks, where each block has (1) a size and (2) a bit allocation. Some embodiments dynamically adjust the size of the blocks during the encoding operation. In some embodiments, unused bits allocated to a first block are rolled over to a second block. In other embodiments, only some of the unused bits are rolled over to the second block.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
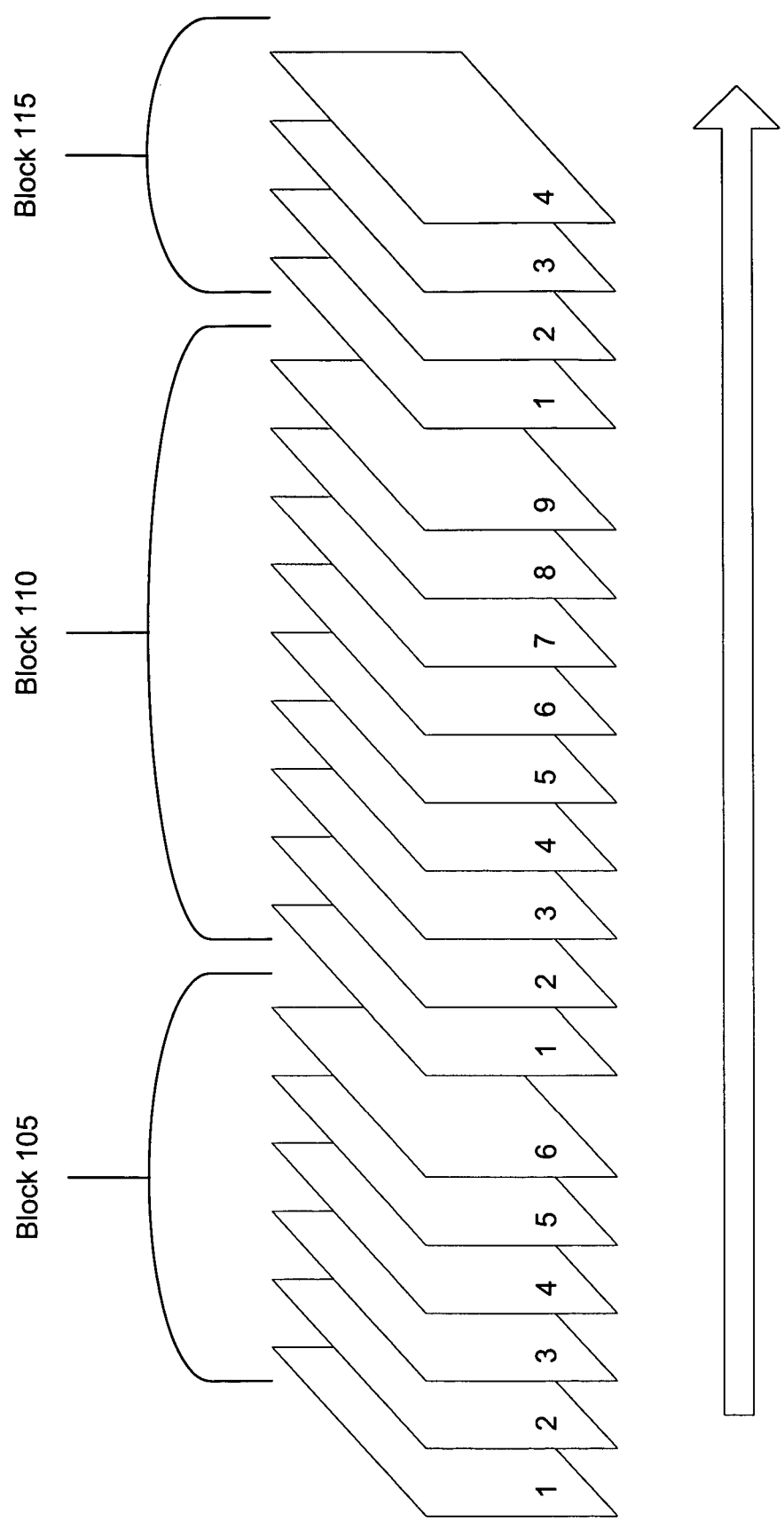
FIG. 1 conceptually illustrates a sequence of frames divided into blocks.

In the following detailed description of the invention, numerous details, examples and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for specifying a bit allocation for encoding a set of images in a sequence of video images. The method computes a masking value for one or more images. The method computes a bit allocation for a current image based on the computed masking value of one or more images.

In some embodiments, the method further ascertains a total number of bits used for images that have been already encoded before computing the bit allocation. The computed bit allocation for the current image is also based on the total number of bits used in some embodiments of the invention.

In some embodiments, the method specifies a bit allocation for the current image by specifying a quantization parameter (QP) value for the current image. The method then adjusts the specified QP value based on a categorization of the current image. Examples of such categorizations include: (1) category 1 images, which are images at natural scene changes or images that collectively capture a fast motion, (2) category 2 images, which are images forced to be intrablock encoded and are not category 1 images, (3) category 3 images, which are images that should be easy to encode, (4) category 4 images, which are images at the transition between simple and difficult images, and (5) category 5 images, which are images that do not fall in the other categories.

In some embodiments, the sequence of frames is divided into a set of blocks, where each block has (1) a size and (2) a bit allocation. Some embodiments dynamically adjust the size of the blocks during the encoding operation. In some embodiments, unused bits allocated to a first block are rolled over to a second block. In other embodiments, only some of the unused bits are rolled over to the second block.

Figure 7:
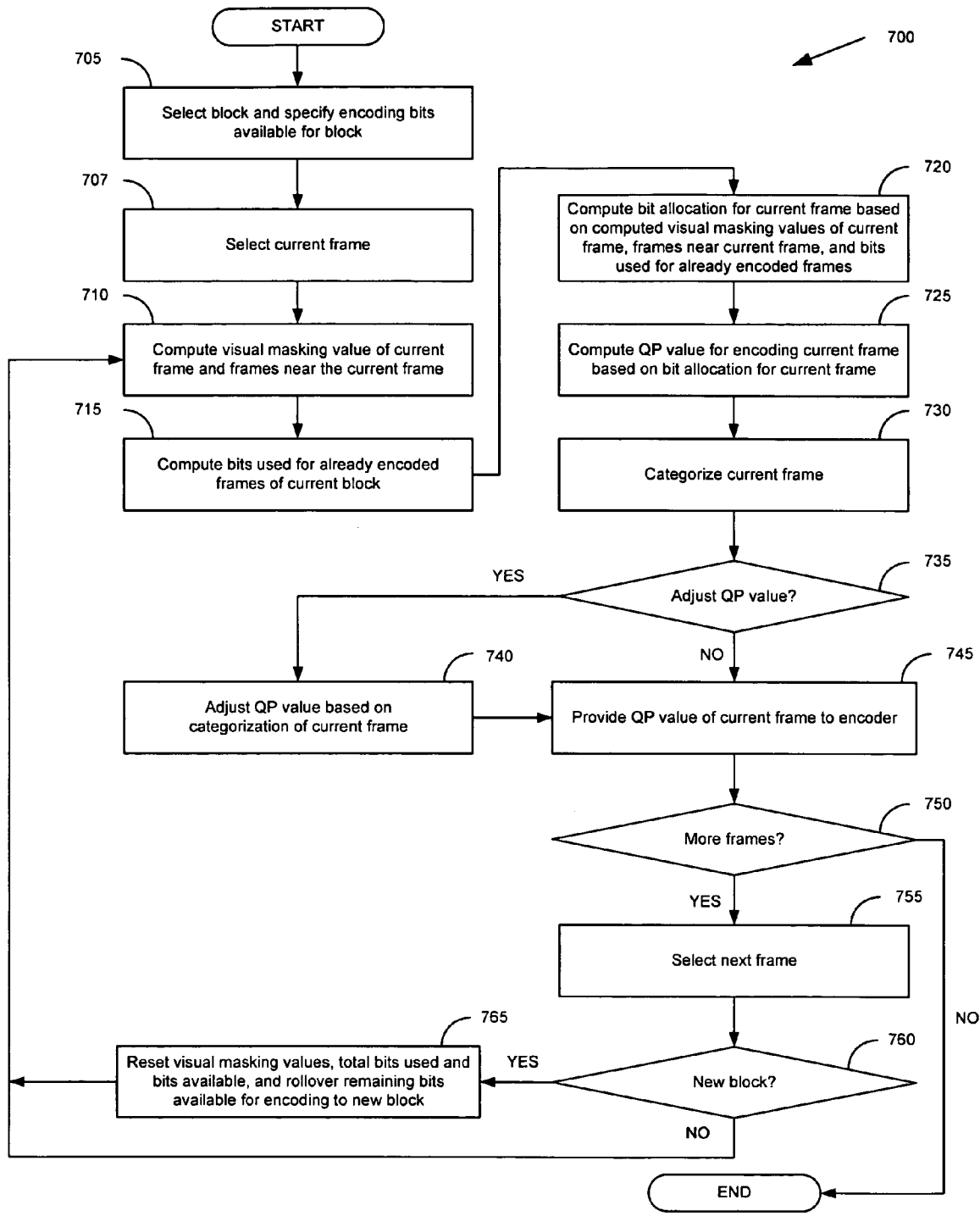
FIG. 7 conceptually illustrates a process for controlling a bit allocation of a current frame.
Figure 8:
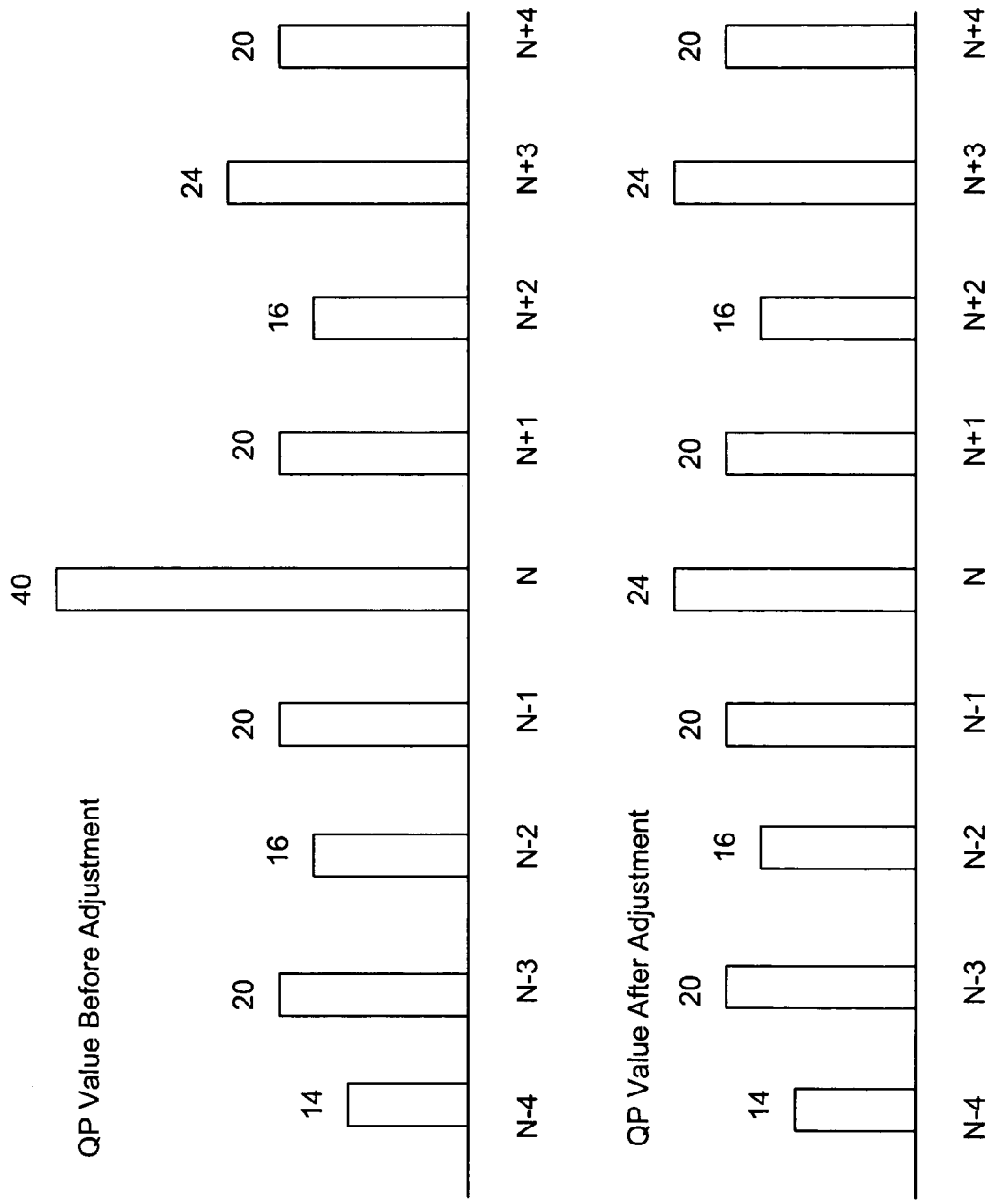
FIG. 8 conceptually illustrates QP values before and after an adjustment.
Figure 9:
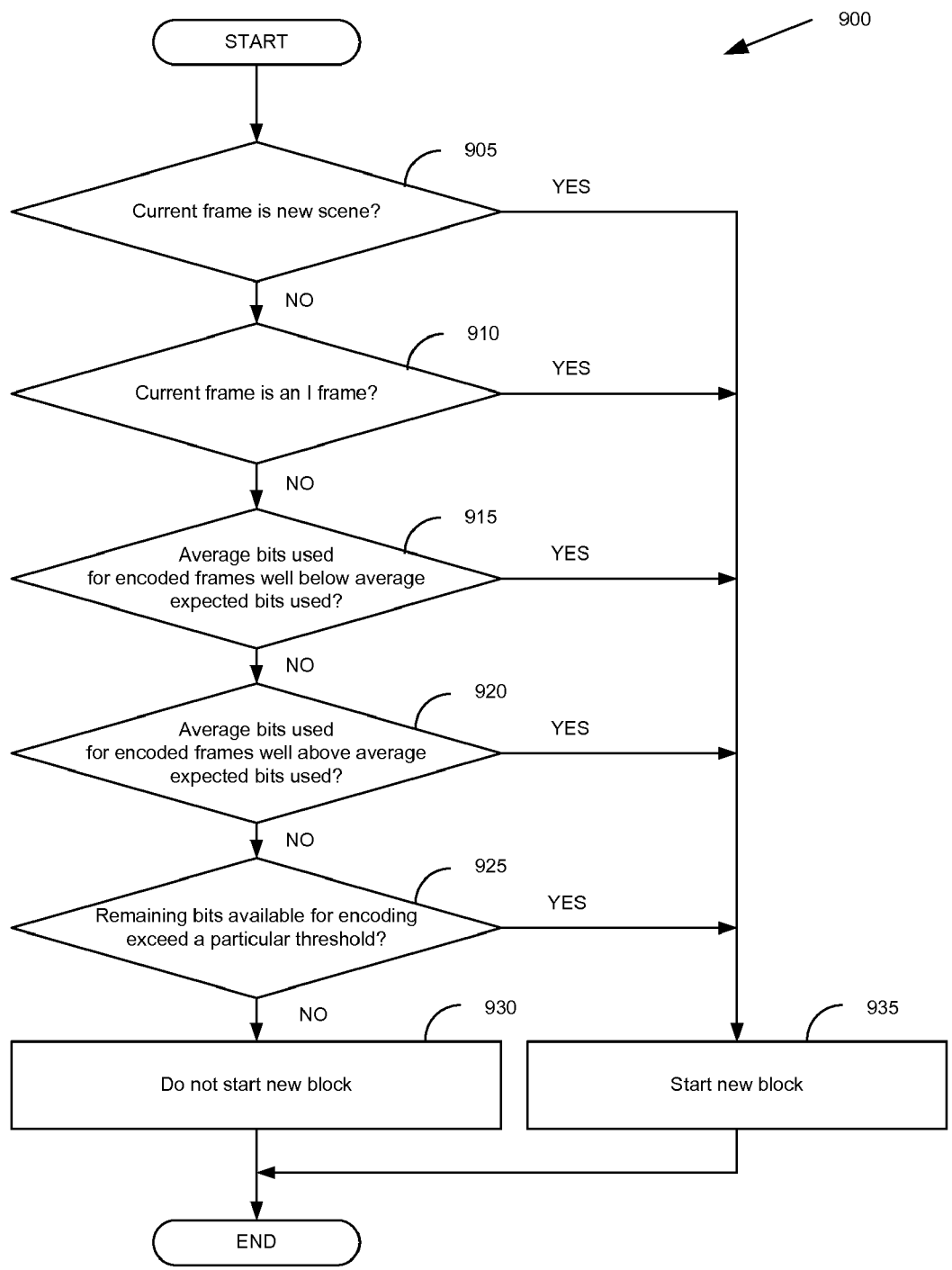
FIG. 9 conceptually illustrates a process for determining whether to implement a new block.

FIGS. 7-9 illustrate more detailed embodiments of the invention. However, before describing these embodiments in Sections II-IV, a brief description is provided of the terms used in the present specification.

I. Definitions

A video stream ("video") comprises a sequence of video images. In some embodiments described below, the video images are video frames. In other embodiments, the video images are not video frames (e.g., they are fields that form a frame, or are some other video image representation).

FIG. 1 conceptually illustrates a video sequence 100 formed by numerous frames. As shown in this figure, the video sequence 100 can be divided into groups of frames, called blocks. FIG. 1 illustrates three blocks 105-115. The figure also illustrates that different blocks can include different numbers of frames. For instance, in FIG. 1, block 105 includes six frames, block 110 includes nine frames, and block 115 includes four frames. In some embodiments, the video may include only one block that includes the entire sequence of frames.

Figure 2:
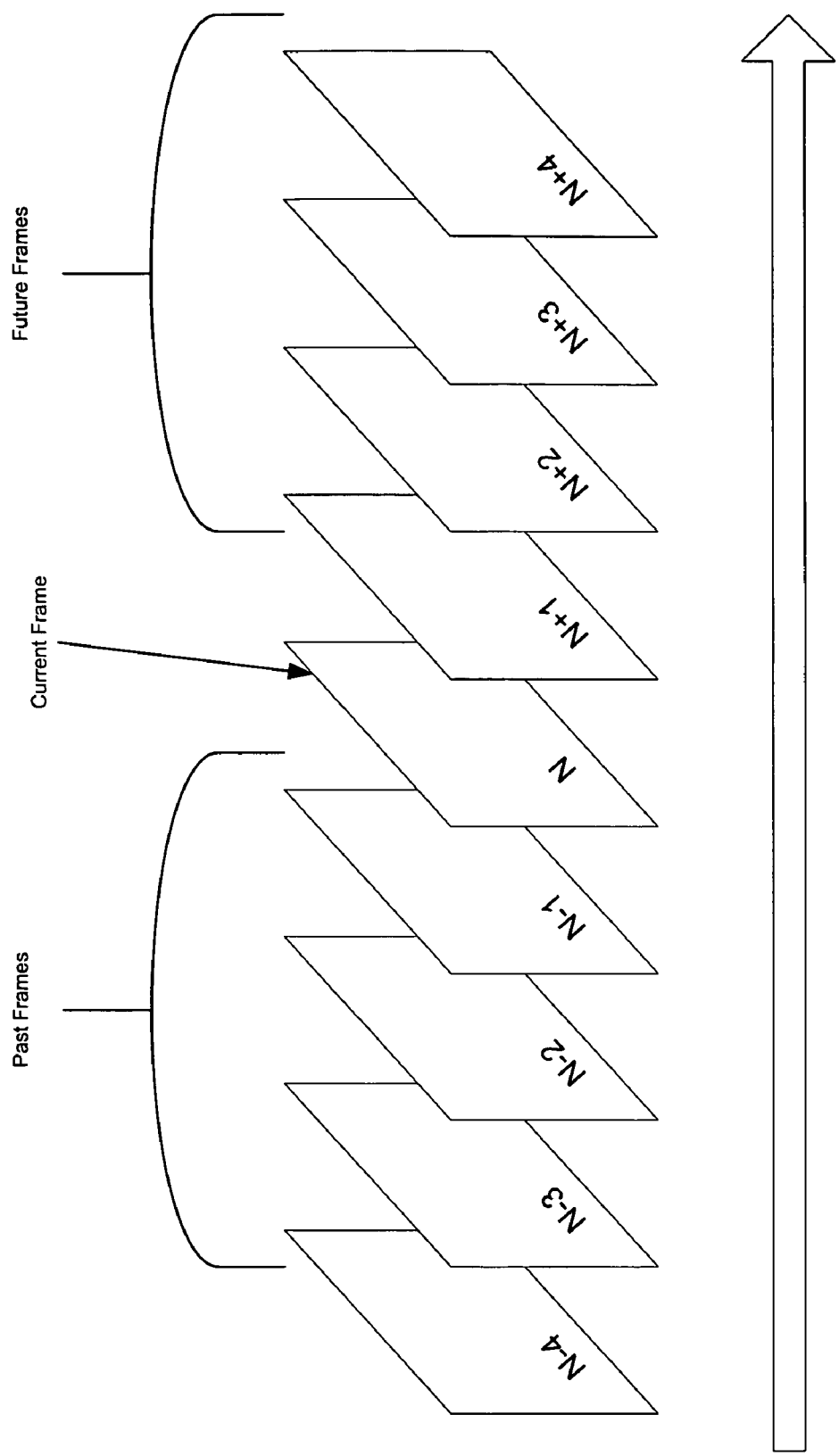
FIG. 2 conceptually illustrates a past, current, and future frames in a block.

Furthermore, within each block, frames can be characterized differently, depending on which frame in the block is currently being encoded. FIG. 2 conceptually illustrates these differently characterized frames in block 110. A current frame refers to the frame that is currently being encoded in the encoding process. A past frame refers to a frame that has already been encoded, and a future frame refers to a frame that will be encoded after the current frame has been encoded. As shown in this figure, past frames N−4, N−3, N−2, and N−1 have already been encoded. The current frame N is being encoded and future frames N+1, N+2, N+3, and N+4 will respectively be encoded after the current frame N has been encoded.

In some embodiments, all uncompressed (i.e., raw) frames require the same amount of bits. However, each frame that is encoded (e.g., compressed) may necessitate different amounts of bits. Generally, difficult frames (e.g., frames that include a complex scene, a lot of detail, and/or high motion) require more bits to encode than simple frames (e.g., frames that include little detail or complexity).

Figure 3:
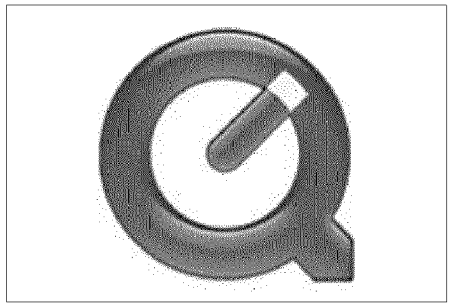
FIG. 3 conceptually illustrates a frame that includes a low spatial masking value.
Figure 4:
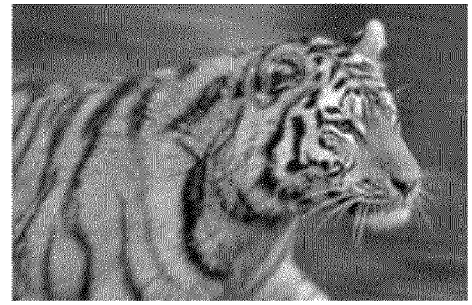
FIG. 4 conceptually illustrates a frame that includes a high spatial masking value.
Figure 5:
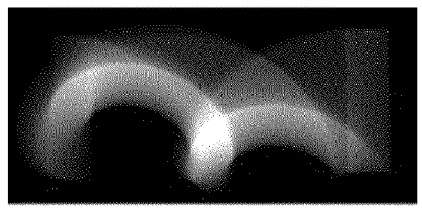
FIG. 5 conceptually illustrates a frame that includes a high motion masking value.
Figure 6:
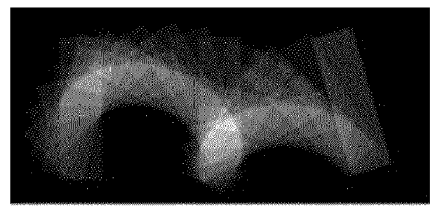
FIG. 6 conceptually illustrates another frame that includes a high motion masking value.

FIG. 3 conceptually illustrates an example of a simple frame in some embodiments. As shown in this figure, the frame includes a logo. On the other hand, FIG. 4 conceptually illustrates a frame that includes a tiger, which is a complex image in some embodiments. As shown in this figure, the tiger has many details and the background includes many color variations. FIGS. 5 and 6 conceptually illustrate frames with lots of motion.

Some embodiments compute a visual masking value for a frame to determine whether a frame is difficult or simple. Visual masking of an image or a portion of the image is an indication of how much coding artifacts can be tolerated in the image or image portion. In some embodiments, the visual masking value includes a spatial component and a temporal component. The spatial component of the masking value is referred to as the spatial masking value. The temporal component of the masking value is referred to as the motion masking value. In the present specification, the visual masking value may refer to the spatial masking value and/or the motion masking value.

The spatial masking value quantizes the complexity and detail of the frame. In some embodiments, a frame that has a high spatial masking value indicates a frame that includes high detail and/or complexity, and vice versa. For instance, FIG. 3, which illustrates a logo, may have a low spatial masking value in some embodiments. On the hand, FIG. 4, which illustrates a tiger, may have a high spatial masking value in some embodiments.

The motion masking value quantizes the presence of motion in a series of frames. In some embodiments, a series of frames that has a high motion masking value indicates that the series of frames includes lots of fast motion, and vice versa. In some embodiments, FIGS. 5-6 would be examples of frames that may have high motion masking values. Alternatively, in some embodiments, FIG. 3 may illustrate an example of a frame with a low motion masking value. However, one skilled in the art will realize that FIGS. 3-6 are exemplary illustrations of frames with different visual masking values. Some embodiments encode a frame with a low visual masking value with a low number of bits, while encoding a frame with a high visual masking value with a high number of bits.

A quantization parameter ("QP") for a frame or a portion of a frame (e.g., a macroblock) is a parameter that is used to quantize the encoding of the frame. In some embodiments, the rate controller uses the quantization parameter of a frame to specify a desired number of bits for the frame. For instance, a high QP value results in the frame being encoded with a low number of bits, while a low QP value results in the frame being encoded with a high number of bits. In some embodiments, a high QP value may result in the frame being dropped (i.e., not encoded).

Various methods of computing masking values (e.g., visual, motion) and QP values are further described in U.S. patent application Ser. No. 11/118,616, entitled "Multi Pass Video Encoding", filed concurrently with the present application, now published as U.S. Patent Publication 2006/0013298, and U.S. patent application Ser. No. 11/118,604, entitled "Encoding with Visual Masking", filed concurrently with the present application, now issued as U.S. Pat. No. 8,005,139. These applications, now U.S. Patent Publication 2006/0013298 and U.S. Pat. No. 8,005,139, are herein incorporated by reference.

II. Controlling Bit Rate for Frame Based On Masking Values of Local Frames and Buffer FIG. 7 conceptually illustrates a process 700 of a single-pass rate controller of some embodiments of the invention. This process 700 controls the bit allocation for encoding a current frame. In some embodiments, initial block sizes for frames in the sequence of frames are specified before the process 700 starts. As shown in this figure, the process 700 (at 705) selects a block and specifies the available number of bits for encoding the frames in the block. In some embodiments, the bits available for encoding is a specified average bit allocation (i.e., average bits use by each frame) times the number of frames in the block. Different embodiments specify bits available differently. Section IV describes several ways for specifying the available number of bits for encoding the frames in the block.

After specifying (at 705) the available number of bits, the process 700 selects (at 707) a current frame in-the block. The process 700 then computes (at 710) the visual masking values of the current frame and computes masking values for the current frame's neighboring frames, if these values were not previously computed.

Once the visual masking values are computed (at 710), the process 700 ascertains (at 715) the total number of bits that have been used to encode the past frames in the current block (i.e., bits used for the already encoded frames in the current block). In some embodiments, the process 700 ascertains this number by looking at a block phase buffer, which stores past frames in the current block that have already been encoded.

The process 700 then computes (at 720) a bit allocation for the current frame based on the computed visual masking values and computed total number of used bits. In some embodiments, a high visual masking value for the current frame produces (at 720) a high bit allocation for the current frame, and a low visual masking value for the current frame produces (at 720) a low bit allocation for the current frame.

In some embodiments, a higher visual masking value for the current frame and/or the future frames relative to a weighted sum of visual masking values for past frames produces (at 720) a low bit allocation for the current frame, since the process 700 is trying to conserve available bits for encoding the future frames. Alternatively, a lower visual masking value for the current frame and/or the future frames relative to a weighted sum of visual masking values for past frames produces (at 720) a high bit allocation for the current frame, since the process 700 will not need as many bits for encoding the future frames.

When a high total number of bits is used to encode the past frames (i.e., when the block phase buffer stores a large number of bits), some embodiments produce (at 720) a low bit allocation for the current frame because very few bits remain available for encoding. Alternatively, when a low total number of bits is used to encode the past frames (i.e., when the block phase buffer stores a small number of bits), some embodiments produce (at 720) a high bit allocation for the current frame because many bits are available for encoding the frames.

In calculating the total number of bits used to encode past frames, some embodiments track a measure for typical per frame bit usage over a set of frames in the near past (e.g. the bits used in the previously coded frame, the bits used in the last N previously coded frames, or a weighted sum of all previously coded frames within a block). Some embodiments base the bit allocation for the current frame on the ratio of this measure and an a priori expectation of bits to be used for the set of frames in the near past: when the measure is below the a priori expectation, the bit allocation for the current frame may be increased and when the measure is above said a priori expectation, the bit allocation for the current frame may be increased.

Different combinations of the above-mentioned factors (e.g., high visual masking values for future frames in combination with low number of bits in the block phase buffer) produce different bit allocations for the current frame. To account for these differing factors, some embodiments compute a first bit allocation by computing the bit allocation based on the bits used on past frames first, then alter the first bit allocation to generate a second bit allocation based on the visual masking values given the bits used on past frames. Some embodiments track a measure for typical per frame bit usage over a set of frames in the near past and use that to affect the magnitude of the bit allocation alteration derived from the visual masking values. After computing (at 720) the bit allocation for the current frame, the process 720 computes (at 725) a QP value for the current frame such that an encoder produces the computed bit allocation when the encoder encodes the current frame. As previously mentioned, a low QP value produces a high bit allocation and a high QP value produces a low bit allocation. Thus, if a high bit allocation is computed (at 720), the process 700 computes a low QP value for the current frame. Alternatively, if a low bit allocation is computed (at 720), the process 700 computes a high QP value for the current frame.

Next, at 730, the process 700 categorizes the current frame. In some embodiments, the current frame can be categorized in one of the following categories: (1) category 1 frame, which is a frame at a natural scene change or a frame that collectively captures a fast motion with other frames, (2) category 2 frame, which is a frame forced to be intrablock encoded and are not category 1 images, (3) category 3 frame, which is a frame that should be easy to encode, (4) category 4 frame, which is a frame at the transition between simple and/or difficult images, and (5) category 5 frame, which is a frame that does not fall in the other categories. These categories of frames will be further described below in Section III.

Once the process 700 has categorized (at 730) the current frame, the process 700 determines (at 735) whether the computed QP value needs to be adjusted (e.g., whether the bit allocation needs to be adjusted) based on the current frame's category. In some embodiments, the above-mentioned categories 2-5 require QP adjustments. If an adjustment is required, the process 700 proceeds to 740 to adjust the QP value based on the categorization of the current frame (at 730). A process for adjusting the QP value is further described below in section III.

After adjusting (at 740) the QP value or determining (at 735) that no adjustment is required, the process 700 provides (at 745) the QP value of the current frame to an encoder that subsequently encodes the current frame using the QP value. The encoded current frame requires a particular number of bits. In some embodiments, the particular number of bits used to encode the current frame is identical to the bit allocation computed at 720. In other embodiments, the particular number of bits used is within a threshold number of the bit allocation computed at 720.

Once the current frame is encoded (at 745), the process 700 determines (at 750) whether there is an additional frame (e.g., additional frame in the sequence of frames). If not, the process 700 ends. However, if there is an additional frame, the process 700 selects (at 755) the next frame (e.g., next frame in the sequence of frames). In some embodiments, this next frame is now the current frame.

After selecting (at 755) the next frame, the process 700 determines (at 760) whether to start a new block. In some embodiments, the determination of whether to start a new block entails determining whether to adjust the size of the current block. If the process 700 determines (at 760) to start a new block, the process 700 proceeds to 765 to reset the visual masking values, total number of bits used and bits available for encoding. However, some embodiments may reset only some of the above mentioned masking values. Some embodiments also specify (at 765) the current frame to be intrablock encoded (i.e., encoded as an I-frame). In some embodiments, the process 700 rolls over (at 765) any remaining (e.g., unused) bits available for encoding to the new block. A process for determining whether to start a new block and a process for determining a rollover amount of bits are further described below in section IV.

After the resetting at 765 or after a negative determination at 760, the process 700 proceeds to 710, which was described above. In some embodiments, the process 700 is performed iteratively until all the frames have been encoded. Furthermore, as will be described below in Section IV, the sequence of frames may have varying block sizes in some embodiments.

III. Adjusting QP Value Based on Categorization of Frame

As mentioned above, some embodiments use the following five categories to categorize a frame: (1) category 1 frame, which is a frame at a natural scene change or a frame that collectively captures a fast motion with other frames, (2) category 2 frame, which is a frame forced to be intrablock encoded and is not a category 1 image, (3) category 3 frame, which is a frame that should be easy to encode, (4) category 4 frame, which is a frame at the transition between simple and/or difficult images, and (5) category 5 frame, which is a frame that does not fall in the other categories. Some embodiments define the above mentioned categories based on the rate of change in the masking values of one or more frames (past frame, future frame) near the current frames A category 1 frame is generally difficult to encode (i.e., requires a lot of bits) because it cannot be encoded using any previously encoded frame. For example, if the frame in FIG. 4 (which includes the tiger) follows the frame in FIG. 3 (which includes the logo), the frame that includes the tiger may be categorized as a category 1 frame, since the frame may be considered a natural scene change.

In some embodiments, a frame is a category 1 frame when the combination of the spatial and motion masking values is above a particular maximum threshold value (e.g., very high value). In some embodiments, when a current frame is categorized as a category 1 frame, no adjustment is made to the computed QP value.

In some embodiments, a frame that is specified to be encoded with relatively low dependency on previously encoded frames (e.g., specified to be an I frame) and the frame does not include a natural scene change is a category 2 frame. In some embodiments, a current frame is a category 2 frame when (1) the current frame is specified to be an I frame, (2) the spatial masking value of the current frame is greater than a particular minimum threshold value, and (3) the motion masking value of the current frame is less than a particular maximum threshold value.

In some embodiments, when a frame is categorized as a category 2 frame, the process 700 adjusts (at 740) the QP value of the current frame to be within a threshold value of the QP values of the current frame's neighboring frames (e.g., past and/or future frames). FIG. 8 conceptually illustrates such an adjustment. As shown in this figure, the frame N has a computed QP value of 40. This QP value is substantially higher than the QP values of its neighboring frames (e.g., frame N−1, frame N+1). In some embodiments, the process 700 adjusts the QP value of frame N to be closer to either or both neighboring frames. As shown in this figure, the QP value of frame N is adjusted to 24. However, different embodiments adjust the QP value differently. For instance, in some embodiments, the magnitude of the adjustment to the QP value is based on how close the total number of bits used for encoding the past frames is to the total number of bits allocated to the block that includes the current frame.

As mentioned above, a category 3 frame is a frame that is easy to encode (e.g., frame that does not include natural scene changes and/or frame in a sequence of frames that does not collectively capture a fast motion), such as the frame shown in FIG. 3. In some embodiments, a current frame is categorized a category 3 frame (e.g., simple frame) when the combination of the spatial and motion masking values of the current frame is below a particular minimum threshold value (e.g., very low value). In some embodiments, when a current frame is categorized as a category 3 frame, the process 700 decreases (at 740) the QP value of the current frame.

As mentioned above, a category 4 frame (i.e., transition frame) is a frame that occurs before and/or after categories 1-3 frames. However, a transition frame does not need to occur immediately before and/or after categories 1-3 frames. In some embodiments, a current frame is categorized as a transition frame when the current frame is within a particular threshold of the closest difficult or simple frame (e.g., categories 1-3 frame). In some embodiments, when a current frame is categorized as a transition frame, the process 700 adjusts (at 740) the QP value of the current frame to be within a threshold value of the QP value of the nearest difficult or simple frame. However, in some embodiments, when the nearest difficult or simple frame (e.g., categories 1-3 frame) is in the future, the process 700 does not make an adjustment.

In some embodiments, a frame that does not fall in any of the above categories is a category 5 frame (e.g., catch all frame). In some embodiments, when a current frame is categorized as a category 5 frame, no adjustment is made to the QP value of the current frame.

IV. Adjusting Block Size

A. Variable Block Size

Some embodiments of the invention adjust the size of one or more blocks in a video stream. As mentioned above, some embodiments adjust the block size by determining (at 760) whether to start a new block. FIG. 9 conceptually illustrates a process 900 for determining whether to start a new block (e.g., whether to adjust a current block size). In some embodiments, this process 900 may be implemented at 760 of the process 700.

As shown in this figure, the process 900 determines (at 905) whether the current frame is a new scene (e.g., whether the current frame is scene change). If not, the process 900 determines (at 910) whether the current frame should be intrablock encoded (i.e., whether the current frame is specified to be an I frame). If the process 900 determines (at 910) the current frames should not be intrablock encoded, the process 900 proceeds to determine (at 915) whether the average bit allocation for the encoded frames is below a minimum threshold value. In some embodiments, this condition is met when the average bit allocation for the encoded frames (e.g., past frames) is well below an expected average bit allocation for the frames in the current block.

If the average bit allocation is not below the minimum threshold value, the process 900 determines (at 920) whether the average bit allocation for the encoded frames (e.g., past frames) is above a maximum threshold value. In some embodiments, this particular condition is met when the average bit allocation for the encoded frames is well above an expected average bit allocation for the frames in the current block. If this particular condition is not met, the process 900 proceeds to determine (at 925) whether the total number of bits used for encoding the past frames (e.g., total number of bits in the block phase buffer) has exceeded a particular threshold value. In some embodiments, this condition is satisfied when the total number of bits used for encoding the past frames reaches a predetermined number of bits. For instance, this condition is satisfied when the total number of bits used for encoding the past frames equals the number of bits allocated to the block at 705. If not, the process 900 does not (at 930) start a new block and ends. However, if the process 900 determines (at 905, 910, 915, 920, or 925) that any of the above mentioned conditions is met (e.g., new scene, I frame), the process 900 proceeds to 935 to start a new block and ends.

Some embodiments might perform some or all of the above determinations. Furthermore, different embodiments may specify minimum and maximum threshold values differently.

B. Rollover of Unused Allocated Bits

In some embodiments, the allocated number of bits for a particular block may not be the actual number of bits used during the encoding process. The difference between the allocated and the actual number of bits is referred to as "unused allocated bits." In particular, the unused allocated bits for a particular block would be negative if the actual number of bits used is greater than the allocated number of bits for a particular block. In some embodiments, these unused allocated bits are "rolled over" to the next block. In such instances, the unused allocated bits are added to the allocated bits for the next block. Thus, in addition to the total number of bits that would already be allocated based on the specified average bit allocation times the number of frames in the block, some embodiments further allocate the unused available bits to the next block, which would result in less bits being allocated for the block if the unused allocated bits from a previously encoded block is negative.

Figure 10:
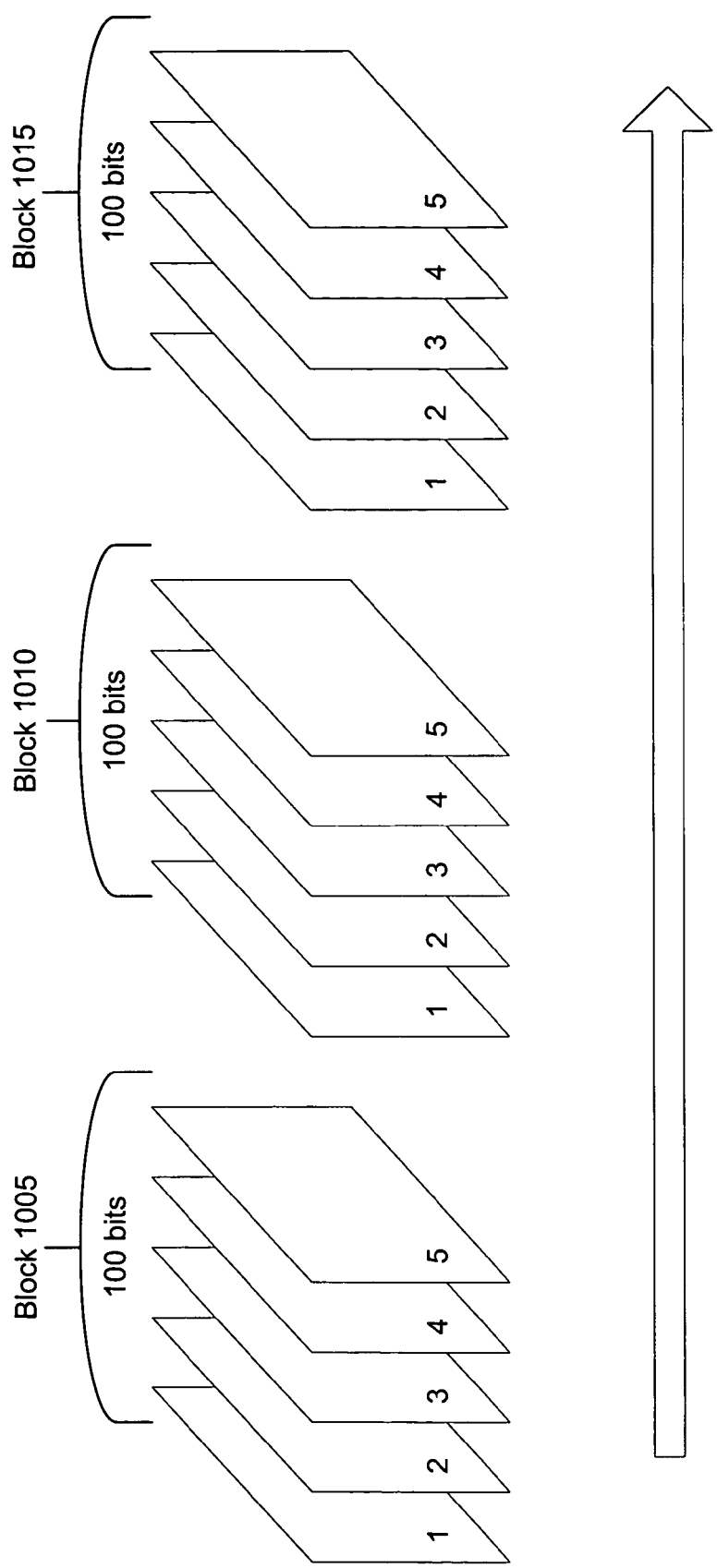
FIG. 10 conceptually illustrates a bit allocation before roll over.
Figure 11:
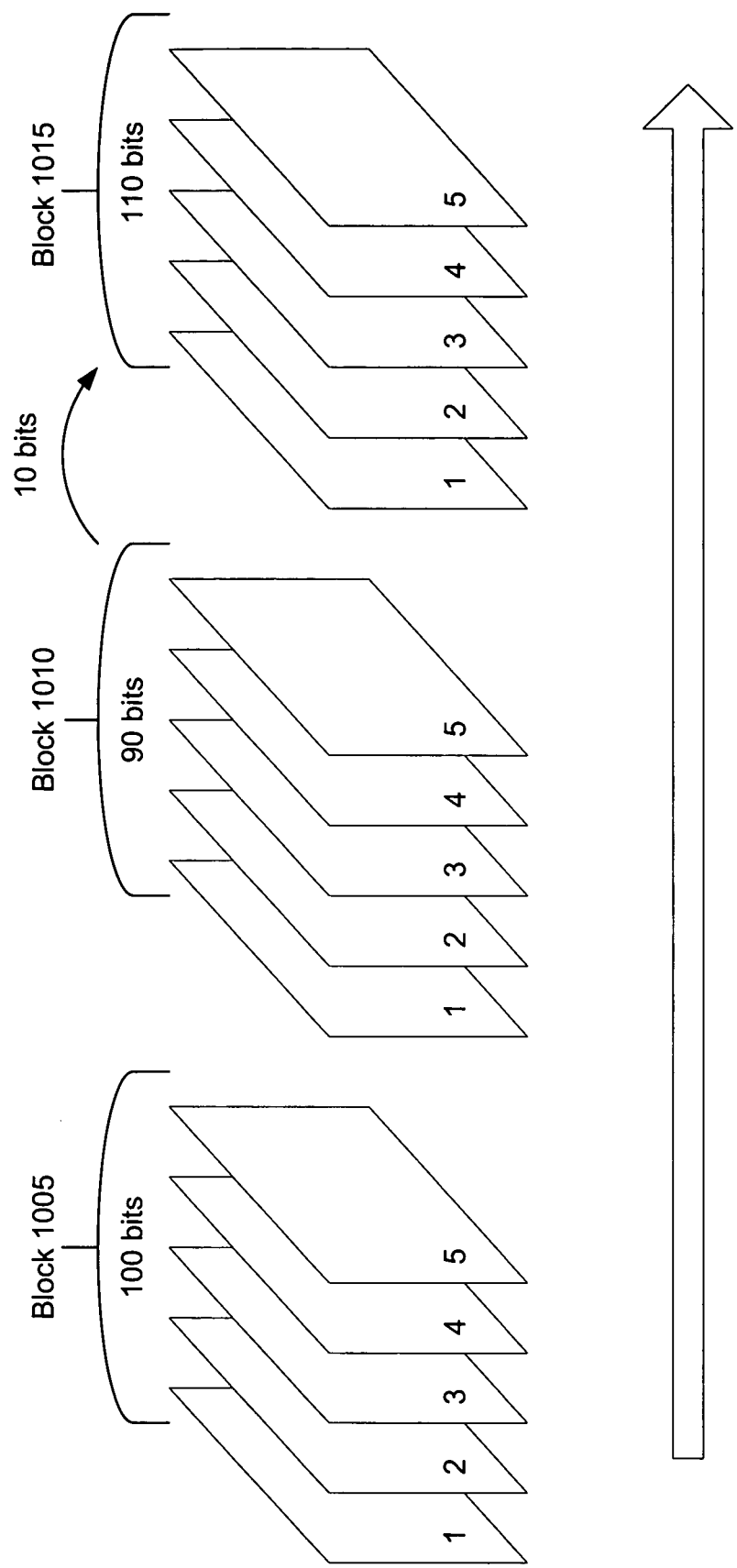
FIG. 11 conceptually illustrates a bit allocation after roll over.

FIG. 10 conceptually illustrates blocks in a sequence of frames that include various bit allocations before unused available bits are rolled over. As shown in this figure, each block has five frames. FIG. 10 conceptually illustrates the total bits allocated to each block to be 100, for an average bit allocation of 20 bits/frame. FIG. 11 conceptually illustrates unused available bits that are rolled over to the next block. As shown in this figure, block 1010 only used 90 total bits and the unused 10 bits are rolled over to block 1015. As such, block 1015 is allocated 110 total bits.

In some embodiments, not all the unused bits are rolled over to the next block. In such instances, up to an initial percentage of the unused available bits are rolled over to the next block. Any remaining unused bits are gradually rolled over to a subsequent block (e.g., block after the next block) and so on and so forth. In some embodiments, the first twenty percent (20%) of the unused available bits are rolled over to the next block; only a fraction of the unused available bits in excess of 20% are rolled over.

C. Allocating Encoding Bits to Blocks

As mentioned above, some embodiments allocate the number of bits to a block based on a specified average bit allocation of frames in a sequence of frames. Thus, in some embodiments, the total number of bits allocated to a block is the specified average bit allocation times the number of frames initially in the block. In many instances, not all bits allocated to a block will be used to encode the frames in the block. Some embodiments of the invention may specify (at 705 or 765) a higher bit allocation than should be specified to a block (e.g., when standards specify a particular bit allocation for a block). In some embodiments of the invention, the purpose of specifying the higher bit allocation to the block is to offset for the under usage of the bits allocated to blocks. Thus, for example, when a block should only be allocated 100 total bits (e.g. when standards specify 100 total bits), the process 700 may allocate (at 705 or 765) 120 total bits to the block. However, once the block reaches 100 total bits (e.g., when the block phase buffer reaches 100 total bits), even if not all the frames in the block have been encoded, a new block is started. Alternatively, in some embodiments, a block is allocated a lower number of bits than should be specified for the block. In another example, a block is setup as 120 frames so that it is allocated enough bits for 120 frames; however, once 100 frames are encoded, a new block is started.

V. Computer System

Figure 12:
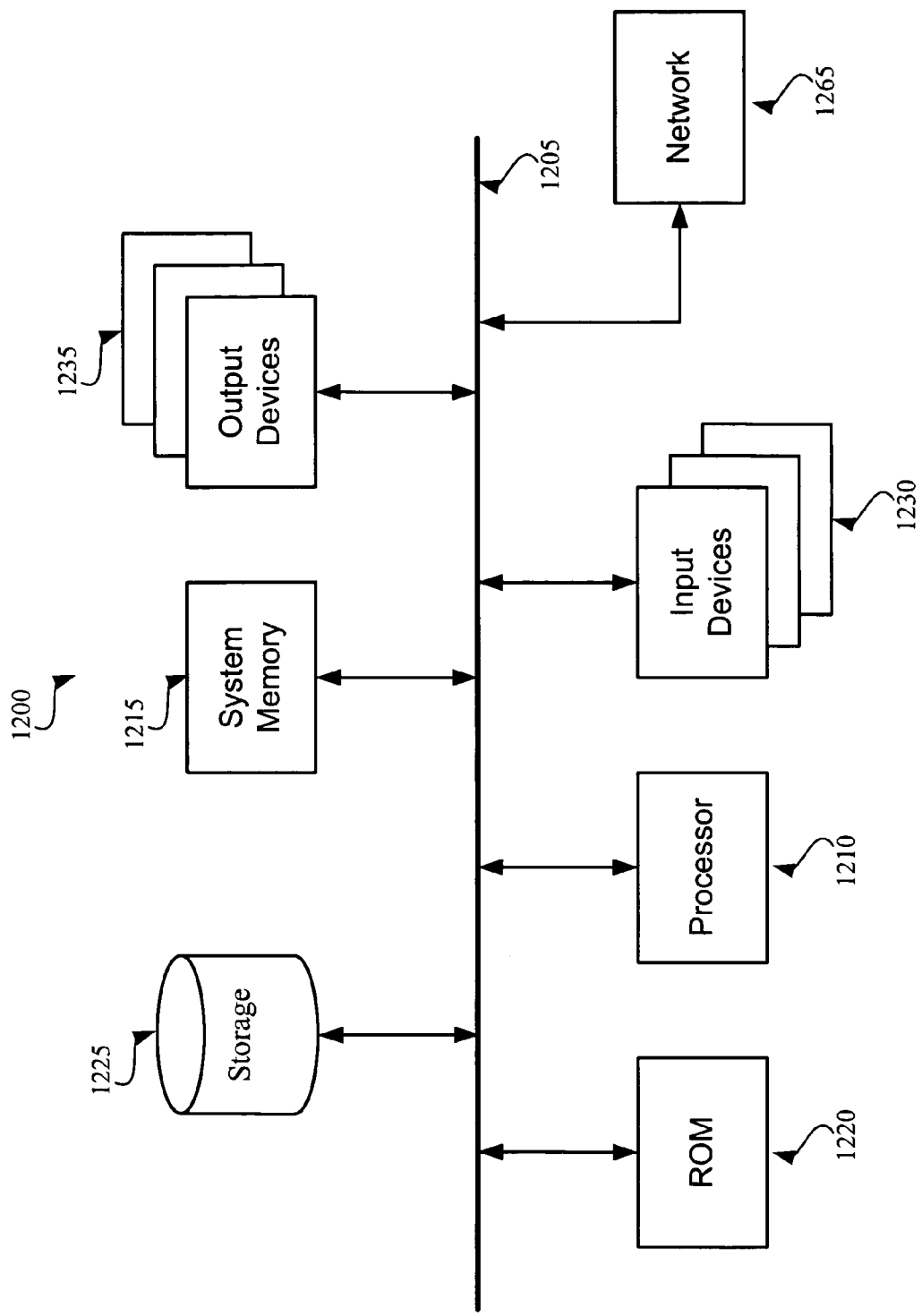
FIG. 12 conceptually illustrates a computer system with which some embodiments of the invention are implemented.

FIG. 12 conceptually illustrates a computer system with which some embodiments of the invention are implemented. Computer system 1200 includes a bus 1205, a processor 1210, a system memory 1215, a read-only memory 1220, a permanent storage device 1225, input devices 1230, and output devices 1235.

The bus 1205 collectively represents all system, peripheral, and chipset buses that support communication among internal devices of the computer system 1200. For instance, the bus 1205 communicatively connects the processor 1210 with the read-only memory 1220, the system memory 1215, and the permanent storage device 1225.

From these various memory units, the processor 1210 retrieves instructions to execute and data to process in order to execute the processes of the invention. The read-only-memory (ROM) 1220 stores static data and instructions that are needed by the processor 1210 and other modules of the computer system. The permanent storage device 1225, on the other hand, is a read-and-write memory device. This device is a non-volatile memory unit that stores instruction and data even when the computer system 1200 is off. Some embodiments of the invention use a mass-storage device (such as a magnetic or optical disk and its corresponding disk drive) as the permanent storage device 1225. Other embodiments use a removable storage device (such as a floppy disk or zip® disk, and its corresponding disk drive) as the permanent storage device.

Like the permanent storage device 1225, the system memory 1215 is a read-and-write memory device. However, unlike storage device 1225, the system memory is a volatile read-and-write memory, such as a random access memory. The system memory stores some of the instructions and data that the processor needs at runtime. In some embodiments, the invention's processes are stored in the system memory 1215, the permanent storage device 1225, and/or the read-only memory 1220.

The bus 1205 also connects to the input and output devices 1230 and 1235. The input devices enable the user to communicate information and select commands to the computer system. The input devices 1230 include alphanumeric keyboards and cursor-controllers. The output devices 1235 display images generated by the computer system. The output devices include printers and display devices, such as cathode ray tubes (CRT) or liquid crystal displays (LCD).

Finally, as shown in FIG. 12, bus 1205 also couples computer 1200 to a network 1265 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1200 may be used in conjunction with the invention. However, one of ordinary skill in the art will appreciate that any other system configuration may also be used in conjunction with the invention.

While, the invention has been described with reference to numerous specific details, one of ordinary skill in the art will recognize that the invention can be embodied in other specific forms without departing from the spirit of the invention. For instance, in the above specification, a QP value is used to control the bit allocation of the current frame. In some embodiments, other proxy values may be used to control the bit allocation of the current frame. Thus, one of ordinary skill in the art would understand that the invention is not to be limited by the foregoing illustrative details, but rather is to be defined by the appended claims.

What is claimed is:

1. A method for specifying a bit allocation for encoding a current frame in a sequence of video frames, the method comprising:
    computing a visual masking value for each frame in a set of one or more unencoded future frames in order to compute a bit allocation for the current frame, wherein the visual masking value for each frame in the set indicates an amount of tolerable coding artifacts for the frame; and
    by an encoder, computing the bit allocation for the current frame based on the computed visual masking value for each unencoded future frame in the set.

2. The method of claim 1 further comprising ascertaining a measure of bits used for frames that have been already encoded before computing the bit allocation, wherein the computed bit allocation for the current frame is also based on the measure of bits used and an expectation of bits to be used by the frames that have been already encoded.

3. The method of claim 2, wherein the measure of bits used for frames that have been already encoded is a total number of bits used to encode those frames.

4. The method of claim 2, wherein the measure of bits used for frames that have been already encoded is a weighted sum of the bits used to encode those frames.

5. The method of claim 1, wherein the sequence of video frames is divided into a plurality of groups of frames.

6. The method of claim 5 further comprising adjusting a number of frames of one of the groups of frames.

7. The method of claim 5 further comprising:
    computing unused bits of a first group of frames as a difference between actual bits used in the first group of frames and bits allocated to the first group of frames; and
    rolling all unused bits of the first group of frames to a second group of frames.

8. The method of claim 5 further comprising:
    computing unused bits of a first group of frames as a difference between actual bits used in the first group of frames and bits allocated to the first group of frames;
    rolling over a first portion of the unused bits of the first group of frames to a second group of frames; and
    rolling over a second portion of the unused bits of the first group of frames to a third group of frames, the first, second, and third groups of frames being different groups of frames.

9. The method of claim 5, wherein a number of bits allocated to a group is higher than a number of bits necessary for the group.

10. The method of claim 5, wherein a number of bits allocated to a group is lower than a number of bits necessary for the group.

11. The method of claim 1, wherein the visual masking value of each particular frame comprises a motion masking value for indicating motion in a set of frames comprising the particular frame.

12. The method of claim 1, wherein the visual masking value of each particular frame comprises a spatial masking value for indicating complexity and details of the particular frame.

13. The method of claim 1, wherein the visual masking value of each particular frame comprises a motion masking value for indicating motion in a set of frames comprising the particular frame and a spatial masking value for indicating complexity and details of the particular frame.

14. A method for specifying a bit allocation for encoding a current frame in a sequence of video frames, the method comprising:
    computing a visual masking value for each frame in a set of one or more unencoded future frames in order to compute a bit allocation for the current frame, the visual masking value of each unencoded future frame in the set indicating an amount of tolerable coding artifacts for the unencoded future frame;
    specifying a quantization parameter (QP) value for the current frame; and
    by an encoder, computing the bit allocation for the current frame based on the computed visual masking value for each unencoded future frame in the set and the specified QP value for the current frame.

15. The method of claim 14 further comprising adjusting the specified QP value based on a categorization of the current frame.

16. The method of claim 14 further comprising adjusting the specified QP value based on a rate of change in the visual masking values of one or more frames that neighbor the current frame.

17. The method of claim 15, wherein the adjustment to the QP value comprises a magnitude, wherein the magnitude is based on how close a total number of bits used for encoding past frames is to a total number of bits allocated to a block of frames that includes the current frame.

18. The method of claim 14, wherein the bit allocation for the current frame is a first bit allocation, wherein computing the first bit allocation comprises:
    computing a second bit allocation based on the computed visual masking value for each unencoded future frame in the set and a weighted sum of visual masking values of one or more past frames; and
    determining the first bit allocation based on the computed second bit allocation and the specified QP value for the current frame.

19. The method of claim 14 further comprising encoding the current frame using the computed bit allocation for the current frame.

20. A non-transitory computer readable medium storing a computer program for specifying a bit allocation for encoding a current frame in a sequence of video frames, the computer program executable by at least one processor, the computer program comprising sets of instructions for:
    computing a visual masking value for each frame in a set of one or more unencoded future frames in order to compute a bit allocation for the current frame, wherein the visual masking value for each unencoded future frame in the set indicates an amount of tolerable coding artifacts for the unencoded future frame; and
    computing the bit allocation for the current frame based on the computed visual masking value for each unencoded future frame in the set of unencoded future frames.

21. The non-transitory computer readable medium of claim 20, wherein the computer program further comprises a set of instructions for ascertaining a total number of bits used for frames that have been already encoded before computing the bit allocation, wherein the computed bit allocation for the current frame is also based on the total number of bits used.

22. The non-transitory computer readable medium of claim 20, wherein the sequence of video frames is divided into a plurality of groups of frames.

23. The non-transitory computer readable medium of claim 22, wherein the computer program further comprises a set of instructions for adjusting a number of frames of one of the groups of frames.

24. The non-transitory computer readable medium of claim 23, wherein the set of instructions for adjusting the number of frames of one of the groups of frames comprises a set of instructions for determining whether the current frame is a new scene.

25. The non-transitory computer readable medium of claim 23, wherein the set of instructions for adjusting the number of frames of one of the groups of frames comprises a set of instructions for determining whether the current frame is an intrablock encoded frame.

26. The non-transitory computer readable medium of claim 23, wherein the set of instructions for adjusting the number of frames of one of the groups of frames comprises a set of instructions for determining whether an average number of bits used for frames that have been already encoded is below an expectation of an average number of bits to be used by the frames that have been already encoded.

27. The non-transitory computer readable medium of claim 23, wherein the set of instructions for adjusting the number of frames of one of the groups of frames comprises a set of instructions for determining whether an average number of bits used for frames that have been already encoded is above an expectation of an average number of bits to be used by the frames that have been already encoded.

28. The non-transitory computer readable medium of claim 23, wherein the set of instructions for adjusting the number of frames of one of the groups of frames comprises a set of instructions for determining whether a total number of bits used for encoding past frames exceeds a particular threshold.

29. The non-transitory computer readable medium of claim 23, wherein the set of instructions for adjusting the number of frames of one of the groups of frames comprises a set of instructions for determining whether to start a new group of frames.

30. The non-transitory computer readable medium of claim 20, wherein the visual masking value of each particular frame comprises a motion masking value for indicating motion in a set of frames comprising the particular frame and a spatial masking value for indicating complexity and details of the particular frame.

31. A non-transitory computer readable medium storing a computer program for specifying a bit allocation for encoding a current frame in a sequence of video frames, the computer program executable by at least one processor, the computer program comprising sets of instructions for:
   computing a visual masking value for each frame in a set of one or more unencoded future frames in order to compute a bit allocation for the current frame, the visual masking value of each unencoded future frame in the set indicating an amount of tolerable coding artifacts for the unencoded future frame;
   specifying a quantization parameter (QP) value for the current frame; and
   computing the bit allocation for the current frame based on the computed visual masking value for each unencoded future frame in the set and the specified QP value for the current frame.

32. The non-transitory computer readable medium of claim 31, wherein the computer program further comprises a set of instructions for adjusting the specified QP value based on a categorization of the current frame, said categorization comprising the current frame being at a scene change and the current frame identified as a frame to be intrablock encoded.

33. The non-transitory computer readable medium of claim 20, wherein the bit allocation for the current frame is a first bit allocation, wherein the set of instructions for computing the first bit allocation comprises sets of instructions for:
   computing a second bit allocation based on the computed visual masking value for each unencoded future frame in the set and a weighted sum of visual masking values of one or more past frames; and
   determining the first bit allocation based on the computed second bit allocation and the specified QP value for the current frame.

34. The non-transitory computer readable medium of claim 31, wherein the computer program further comprises a set of instructions for encoding the current frame using the computed bit allocation for the current frame.

* * * * *

UNITED STATES PATENT AND TRADEMARK OFFICE
CERTIFICATE OF CORRECTION

PATENT NO. : 8,208,536 B2
APPLICATION NO. : 11/118618
DATED : June 26, 2012
INVENTOR(S) : Thomas Pun et al.

Page 1 of 1

It is certified that error appears in the above-identified patent and that said Letters Patent is hereby corrected as shown below:

In the Claims:

Claim 33, column 14, line 28, "20," should read "31,".

Signed and Sealed this
Fourth Day of June, 2013

Teresa Stanek Rea
*Acting Director of the United States Patent and Trademark Office*